Nov. 20, 1962

C. C. PRYOR 3,064,937

ROTARY VALVE

Filed March 30, 1960

INVENTOR
COLLIER C. PRYOR
BY Samuel L. Davidson
ATTORNEY

Nov. 20, 1962   C. C. PRYOR   3,064,937
ROTARY VALVE

Filed March 30, 1960   2 Sheets-Sheet 2

INVENTOR
COLLIER C. PRYOR

BY Samuel L. Davidson
ATTORNEY 3,064,937
ROTARY VALVE
Collier C. Pryor, 2240 Norfolk St., Houston, Tex.
Filed Mar. 30, 1960, Ser. No. 18,672
19 Claims. (Cl. 251—163)

This invention relates to fluid valve assemblies, and more particularly to fluid valve assemblies of the type incorporating a rotatable valve member.

Various types of fluid valve assemblies incorporating rotatable valve members have heretofore been proposed. Such assemblies normally incorporate a valve housing with a valve chamber in the housing. A fluid inlet port is provided on one side of such a chamber, and a fluid outlet port is provided on the opposite side of such a chamber. Valve seats of any one of a number of types are incorporated adjacent each of the ports, and such seats form the terminal or interior ends of the ports, and are adapted to accommodate the surface of the valve member. The valve member itself has a passageway extending therethrough, and is rotatably disposed in engagement with, and between the seats whereby the valve member is rotatable from a first position where the passageway communicates the ports to a second position where the valve member closes the ports. An operating member known as the valve stem extends within the housing and cooperates with the valve member to rotate the same from one position to the other.

The exterior surface of the valve member, as stated, engages the valve seat forming the terminal end of the inlet port, and the valve seat forming the terminal end of the outlet port. The engagement between the surface of the valve member and the respective valve seats is particularly important because if such engagement is not sufficiently tight, the valve "leaks." More particularly, if the engagement between the surface of the valve member and the seat forming the terminal end of the inlet port is not sufficiently tight, fluid can pass through the inlet port and between the surface of the valve member and the inlet port seat into the chamber. Similarly, if the engagement between the surface of the valve member and the valve seat forming the terminal end of the outlet port is not sufficiently tight, fluid in the housing can pass out of the housing between the surface of the valve member and the outlet port seat.

In order to eliminate leakage between the engaging surfaces of the valve member and the valve seats, in structures of the type under consideration, some workers in the art have suggested the use of particular types of material for the valve seats. Others have suggested that the valve seats be shaped in a particular manner, and still others have designed valve assemblies incorporating an adjustment means so that the pressure exerted between the valve member and the valve seats can be increased if necessary. Notwithstanding the fact that such previously-suggested means of overcoming the leakage problem may have constituted improvements over basic structures and partially solved the leakage problem, they certainly did not provide a completely satisfactory solution. The valve member and the valve seats could not be in such tight engagement that rotation of the valve member was effectively prevented, and at the same time the engagement between the valve member and the valve seats had to be sufficiently tight to prevent any serious leakage between the engaging surfaces. In prior valve assemblies, an attempt was made to adjust the pressure of engagement between the valve seat and the valve member such that the leakage was as low as possible, and the force required to rotate the valve member was not excessive. Accordingly, in all of the prior art fluid valve assemblies incorporating a rotatable valve member, the pressure exerted between the valve member and the valve seat was in fact always a constant and compromise valve.

The present invention is directed to the elimination of the disadvantages of compromise adjustment as discussed in the preceding paragraph, and utilizes a variation in pressures between the valve member surface and associated seats, as opposed to a constant pressure, whereby tighter seating is achieved when the valve member is in certain positions than when such member is in other positions.

Actually, tight engagement between the valve member and associated valve seats is of the greatest importance when the valve is closed; that is to say, when the valve member is moved to a position where it blocks communication between the inlet port and the outlet port. Accordingly, a primary object of the present invention is to provide a fluid valve assembly incorporating a rotatable valve member and means for automatically causing the valve member to be more tightly seated when in closed position than when it is being moved to closed position, or from closed position.

Notwithstanding the fact that tight seating is most important when the valve member is in closed position, it should be understood that when the valve is moved to open positon, that is, to a position where the passageway through the valve member communicates the inlet port and the outlet port, the engagement between the valve seats and the valve member is also important. When the valve member is moved to open position, the inlet port is substantially unblocked, and thus the interior of the housing is exposed to the full flow and pressure of the fluid entering the valve assembly. Accordingly, it is desirable to tightly seat the valve member in the open position so as to prevent the full flow and pressure of the incoming fluid from being exerted against sealing gaskets or the like. Specifically, most valve assemblies incorporate at least a seal gasket cooperating with the valve stem arrangement to prevent leakage of fluid from the housing adjacent the valve stem. Thus, the less the volume of fluid within the housing and pressure of the fluid acting on such sealing gasket, the less the possibility of leakage through and around the gasket.

Accordingly, a still further object of the present invention is to provide a fluid valve assembly incorporating a rotatable valve member and means for automatically more tightly seating the rotatable valve member when in the open and closed positions, than when in any position therebetween. In connection with such primary object of the present invention, a further and more specific object is to provide a valve assembly incorporating a rotatable valve member which is always tightly seated, yet easily rotated from open position to closed position, and automatically more tightly seated in the open position and closed position than in any intermediate position.

In addition to providing an improved valve assembly in accordance with the objects set forth hereinabove, this invention is also concerned with providing a valve having the stated advantages, which valve can be easily assembled and inexpensively manufactured, and which valve assembly can be provided with stationary, unadjustable valve seats if desired.

Prior art assemblies, in many instances, have been provided with an inlet or outlet port member which is detachably secured to the housing of the valve assembly and which carries the valve seat. Commonly, the housing is provided with a threaded bore and the inlet port or outlet port member is screwed into the threaded bore after the valve member is inserted within the valve housing. By means of threaded cooperation between the port member and the housing, the seat carried by the port member can be adjustably forced into engagement with the valve member. With this type of construction, it is necessary to accurately bore the housing, or cast the housing, so that the threaded bore is exactly diametrically opposite the port on the other side of the chamber. Moreover, it is difficult to ascertain exactly when the proper force is exerted between the seat and the valve member in such a valve assembly, and the threaded cooperating parts must be to exact dimension.

Because of the inherent disadvantages of valve assemblies of the type described in the preceding paragraph, it is desirable to provide a valve assembly in which the valve seats are stationary and unadjustable, and in which the valve member can be inserted after the housing is provided with suitable seats in desired position.

Accordingly, a still further primary object of the present invention is to provide a valve assembly incorporating a rotatable valve member and conforming with all of the previously-stated objects of the present invention, which assembly is so constructed that the valve member can be non-cooperatively slipped between stationary valve seats and then rotated to operative position in engagement with the seats.

Further and more specific objects of the present invention are: (a) to provide a fluid valve assembly having the advantages discussed in connection with the foregoing stated objects of the invention, in which assembly the means for automatically causing the valve member to more tightly engage the valve seats when in open and closed positions comprises a cooperating cam and abutment arrangement; (b) to provide such a fluid valve assembly wherein the valve member is sectioned along a plane extending diagonally across the longitudinal axis of the passageway of the valve member and wherein the intersection of the plane with the exterior surface of the valve member falls outside of the area engageable by the valve seats so that the edges of the sections of the valve member do no tengage the seats in operation of the assembly; (c) to provide such a valve assembly wherein cams are incorporated, and the cams have planar edge portions and arcuate edge portions, and wherein the planar edge portions cooperate with adjacent cams and the arcuate edge portions cooperate with abutments carried by the housing; (d) to provide such a valve assembly wherein the valve seats have a sphero-concave configuration and wherein the valve member is of truncated spheroidal shape, and is provided with spaced planar faces parallel to the passageway through the valve member, which faces are spaced apart by less distance than the minimum distance between the valve seats whereby the valve can be inserted non-cooperatively between the seats and then rotated to operative position; (e) to provide such a fluid valve assembly wherein the abutment means are adjustable in relation to the cam surfaces with which they cooperate; (f) to provide such a fluid valve assembly wherein the cams are comparatively small plates adapted to be coupled on the planar faces of the valve member and carried thereby; and (g) to provide a fluid valve assembly conforming with all of the preceding objects and incorporating a ball-type valve member which need only be rotated through 90° for opening and closing the fluid passage through the assembly and for operating the cam system.

Briefly, and in its simplest aspects, the invention provides a fluid valve assembly comprising the combination of a valve housing having a valve chamber therein with a fluid inlet port and a fluid outlet port at opposite sides of the chamber. Valve seats are incorporated as the terminal ends of each of the ports, and such seats are adapted to accommodate an arcuate valve surface. A sectioned valve member having a passageway therethrough is rotatably disposed in engagement with, and between, the seats whereby the valve member is rotatable from a first position where the passageway communicates the ports to a second position where the valve member closes the ports. And, in addition, means are provided for automatically causing the valve member to more tightly engage the seats when in the closed position than when being moved into the closed position or from the closed position. According to the preferred embodiment of the invention, means are provided for automatically causing the valve member to more tightly engage the seats when in the closed position as well as when in the open position, than when in any position therebetween. The valve member is, according to the invention, sectioned along a plane extending diagonally across the longitudinal axis of the passageway, and such sectioned plane preferably make an angle of at least substantially 45° with the longitudinal axis of the passageway through the valve member. The cam arrangement which I find best suited for operation of my invention includes cam members which take the form of small plates having planar edges and concavo-convex edges, and the abutments cooperate with the concavo-convex edges of the cams and are adjustable with respect thereto.

As will become apparent from the following detailed description, my invention consists in the construction, arrangements, and combination of the various parts of the fluid valve assembly, whereby the objects contemplated are attained as hereinafter more fully set forth, specifically pointed out in my claims, and illustrated in the accompanying drawings, in which:

FIGURE 4 is a plan view of a pair of cam plates constructed in accordance with the invention, FIGURE 4 presenting an exaggerated example of the manner in which the cam plates cooperate; and FIGURE 5 is a plan view similar to FIGURE 4, but showing the cooperating relationship between the cam plates when the valve member incorporated within the assembly provided by the invention is located intermediate its open and closed positions.

Figure 1:
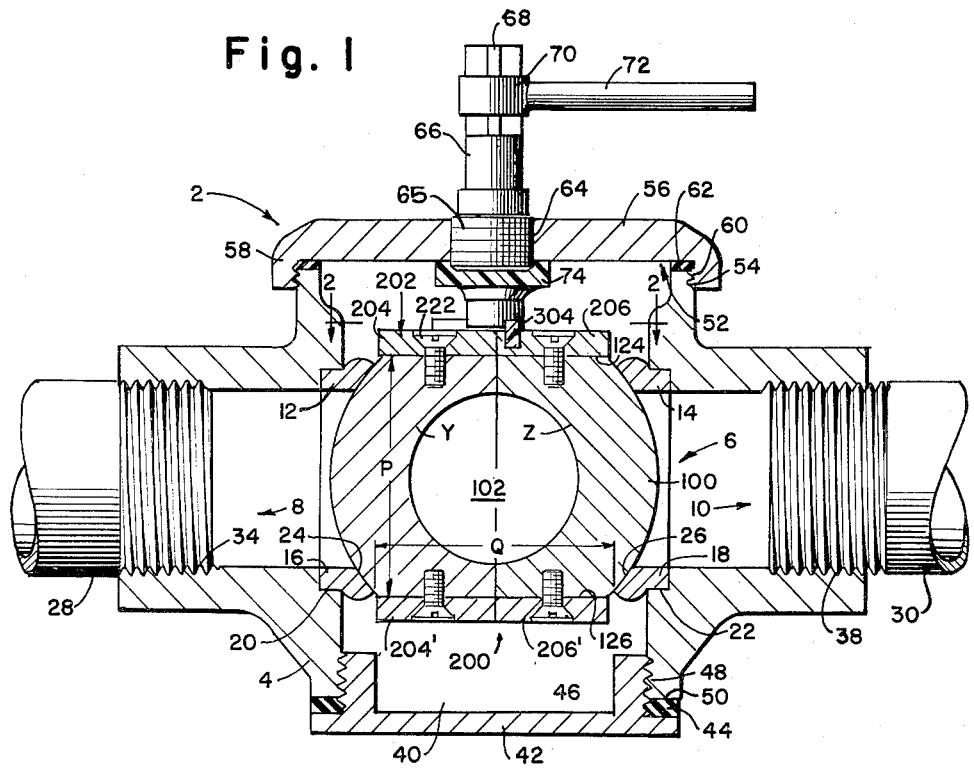
FIGURE 1 is a cross-sectional view of a valve assembly constructed in accordance with the preferred embodiment of the present invention.

If reference is made to FIGURE 1, it will be noted that the numeral 2 has been used to generally designate the fluid valve assembly shown in that figure. The assembly comprises a housing 4 having a valve chamber 6 therein. A fluid inlet port 8 and a fluid outlet port 10 are provided at opposite sides of the chamber. Valve seats 12 and 14 adapted to accommodate an arcuate valve surface form the interior terminal ends of the inlet and outlet ports 8 and 10 respectively.

A sectioned valve member 100 having a passageway 102 therethrough is rotatably disposed in engagement with, and between the seats 12 and 14 whereby the valve member 100 is rotatable from a first position where the passageway communicates the ports 8 and 10 to a second position where the valve member closes the ports 8 and 10. A valve stem 66 extends through the housing and into the valve chamber 6. The stem cooperates with the valve member in a manner hereinafter explained in more detail, so that upon rotation of the handle 72 the valve member is caused to move from the open position to the closed position, or vice versa.

To adapt the valve assembly for use in an ordinary pipeline, the inlet port 8 is provided with threads 34 adjacent the outer end thereof, and the outlet port 10 is provided with threads 38 adjacent the outer end thereof. With such construction, a threaded inlet conduit such as that designated by numeral 28 can be coupled with the inlet port 8, and a threaded outlet conduit such as that designated by the numeral 30 can be coupled with the outlet port 10.

The valve seat members 12 and 14 preferably are formed of a suitable seating material such as tetrafluoroethylene resin (Teflon), however, the seat members can be formed of any suitable material, and if desired, formed as an integral part of the housing. In the preferred construction shown in FIGURE 1, the seat members 12 and 14 have flanged portions 16 and 18 respectively which cooperate with recesses 20 and 22 in opposite walls of the valve chamber to secure the valve seats in proper position. The valve member engaging faces 24 and 26 of the valve seat members 12 and 14 have a configuration adapted to accommodate the surface of the valve member. Thus, since the valve member 100 shown in FIGURE 1 has a spheroidal outline, the valve member engaging faces 24 and 26 have a sphero-concave configuration.

Before considering the details of the cam arrangement provided by the invention, and the detailed construction of the valve member shown in FIGURE 1, it should be pointed out that the housing 4 has an opening in the top and bottom thereof. More particularly, a bore 52 extends through the top of the housing in generally perpendicular relationship to the inlet and outlet ports, and a bore 40 extends through the bottom of the housing, also in generally perpendicular relationship to the inlet and outlet ports. A cap member 56 having a threaded skirt 58 cooperates with the threaded portion 54 of the housing adjacent the bore 52, and such cap member serves to close the opening in the top of the housing. Similarly, a plug member 42 having a threaded skirt 46 cooperates with the threaded portion 48 of the bore 40 to close the opening in the bottom of the housing. Sealing gasket 44 is provided on the underside of the crown portion of plug member 42 to properly seal the plug with the housing, and sealing gasket 62 is provided on the underside of the cap member 56 to properly seal the opening in the top of the housing.

The valve stem 66 passes through a bore 64 in the cap member 56, and a bearing member 65 carried by the stem cooperates with the bore to facilitate rotation of the stem. The sealing gasket 74 is provided adjacent the inside of bore 64 to prevent leakage adjacent the valve stem. The operating handle 72 extends from a collar 70 which is keyed to the valve stem 66 by means of a keyway 68.

Although I have described the manner in which an inlet conduit and outlet conduit can be coupled with the valve assembly, particularly types of closures for the openings in the housing, a particular type of valve stem arrangement, and a preferred form of valve seat, the invention is primarily concerned with the particular type of valve member, and with means for automatically causing the valve member to more tightly engage the seats with which it cooperates under certain conditions. Accordingly, it should be understood that various forms of housings, caps and plugs, inlet and outlet connections, seats, and the like, can be incorporated in a valve assembly constructed in accordance with the invention without departing from the scope and spirit thereof. The only important factors are: (1) that there is a housing having a valve chamber therein with a fluid inlet port and a fluid outlet port at opposite sides of the chamber, and (2) valve seats are provided which are adapted to accommodate an arcuate valve surface and which form the interior terminal ends of each of the ports.

Figure 2:
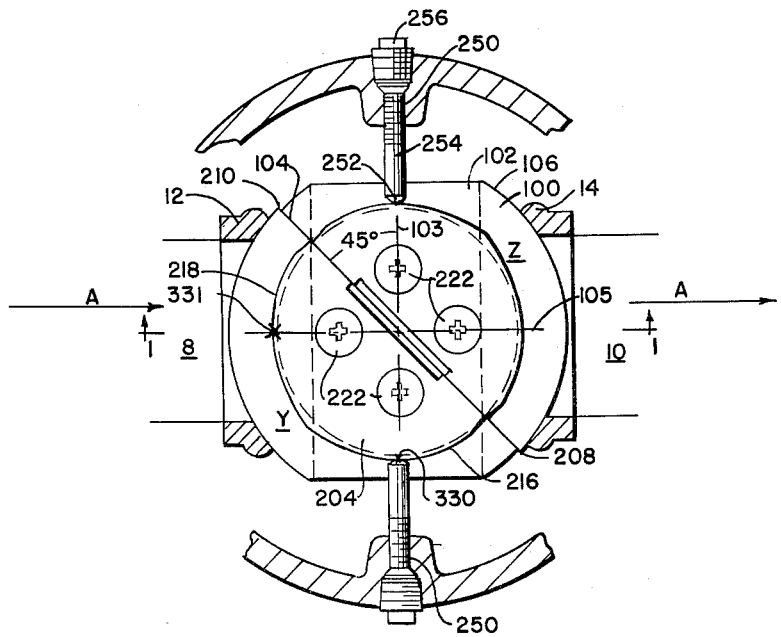
FIGURE 2 is a plan view of the center portion of the valve assembly shown in FIGURE 1, FIGURE 2 having been taken on the line 2—2 of FIGURE 1.

As pointed out hereinabove, the valve member 100 which is rotatably disposed in engagement with, and between the seats 12 and 14, is sectioned. As best shown in FIGURE 2, the plane 104 along which the valve member 100 is sectioned extends diagonally across the passageway 102. The plane 104 intersects the exterior surface 106 of the valve member 100 outside of the area of such exterior surface engageable by the seats 12 and 14. More particularly, the intersection 110 of the plane 104 with the exterior surface of the valve adjacent the seat 12 lies outside of the area of the exterior surface of the valve member engaged by the seat 12. Similarly, the intersection 108 of the plane 104 with the exterior surface of the valve member adjacent the seat 14 falls outside of the area of such surface engaged by the seat 14.

The valve member 100 is shown in closed position in FIGURE 2, that is, in a position where the valve member blocks communication between the inlet port 8 and the outlet port 10. When the valve member 100 is in closed position, the passageway 102 extending therethrough is disposed in generally perpendicular relation to the direction of fluid flow through the valve when the same is in open position. Specifically, the arrows designated by the letter A represent the direction of fluid flow through the valve when open, and the longitudinal axis of the passageway 102 is disposed perpendicular with respect to such direction.

Figure 3:
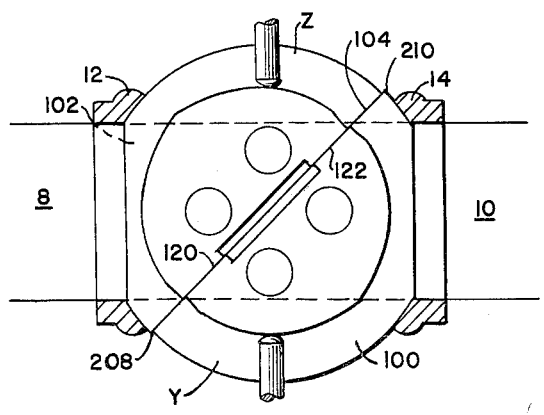
FIGURE 3 is a plan view, similar to FIGURE 2, but showing the valve member provided by the invention in somewhat exaggerated form.

When the valve is moved from the closed position as shown in FIGURE 2 to the open position as shown in FIGURE 3, the passageway 102 is aligned with the inlet and outlet ports, and fluid flows from the inlet port 8 to the outlet port 10 through the passageway 102. If the valve is rotated clockwise from the closed position to the open position, then the intersections 108 and 110 of the plane 104 with the exterior surface 106 of the valve member do not pass across the seats 12 and 14.

It should be apparent that when the valve member is sectioned along the plane 104 as described hereinabove, it comprises two parts. These parts are designated in the drawings by the letters Y and Z. As shown, the plane 104 is a vertical plane extending diagonally across the passageway 102. Thus, the part Y of the valve member 100 has a planar face, or bearing face, which cooperates with a similar planar, or bearing face of the part Z of the valve member in the plane 104. The bearing face of part Z is designated by the numeral 120 in FIGURE 3, and the bearing face of part Y is designated by the numeral 122 in that figure. Bearing face 120 of part Z is slidable along bearing face 122 of part Y, or vice versa, bearing face 122 of part Y is slidable along bearing face 120 of part Z. The two halves of the valve member 100, namely parts Y and Z, are thus movable with respect to one another, in the plane 104.

The sectioned valve member 100 comprising parts Y and Z is provided with spaced planar faces 124 and 126 (FIGURE 1) extending generally parallel to one another and to the passageway 102 through the valve member. In effect, the valve member 100 comprises a sphere with its top end and bottom end shaved off. The sphere is split in half along a plane disposed perpendicular to the shaved-off top and bottom ends, and extending diagonally across the bore or passageway through the center of the sphere. The valve member 100 can thus be described as being sectioned and having a truncated spheroidal outline.

The distance between the shaved-off top and bottom ends or spaced planar faces 124 and 126, which is designated by the letter P in FIGURE 1, is less than the distance between the inner extremities of the valve seats 12 and 14. The minimum distance between the valve seats is designated by the letter Q in FIGURE 1, and thus P is no greater than Q, and preferably slightly less than Q to facilitate installation. Accordingly, before the members designated by numerals 200 and 202 are coupled with the valve member 100 as shown in FIGURE 1, and as described in detail hereinafter, the valve member 100 can be turned sideways such that it can be slipped non-cooperatively between the valve seats 12 and 14. More particularly, if the valve is turned such that the face 124 is vertically disposed, then the valve can be slipped down between the seats, and subsequently rotated to the operative position shown.

The planar faces 124 and 126, in addition to adapting the valve to be slipped between the seats and then rotated to operative position, provide convenient surfaces on which to secure the cams which are provided by the invention to cause the valve member to more tightly seat when moved to the open and closed positions. According to the preferred embodiments of the invention, the cams are components separate from the valve member, but adapted to be coupled with the valve member and carried on the surfaces 124 and 126.

Although cams are provided on the surface 124 as well as on the surface 126, the cam arrangement provided on each surface is identical, and thus only one such cam arrangement will be described in detail. The cam arrangement provided on the surface or face 124 is shown in plan in FIGURE 5, and generally designated by the numeral 202. The cam arrangement 202 comprises two cam plates 204 and 206. Each cam plate has a planar edge and an arcuate edge. More specifically, cam plate 204 has a planar edge 210 and an arcuate edge 212, and cam plate 206 has a planar edge 208 and an arcuate edge 214. The edge portions 212 and 214 each are provided with two smoothly-curved preferably contiguous cam projections such as those designated by numerals 216 and 218, and such cam projections extend from opposed dwell spaces 220 and 220'. Preferably the projections 216 and 218 are smoothly-curved convex surfaces, and the dwell spaces 220 and 220' are smoothly-curved, concave surfaces. Thus, the arcuate edges 212 and 214 are concavoconvex edges, with one-half of each dwell space disposed adjacent the planar edges 208 and 210 thereof respectively.

FIGURE 1 presents the manner in which the plates 204 and 206 are secured to the valve member 100. In particular, screws 222 pass through the cam plates 204 and 206 and cooperate with threaded bores in the valve member 100. The cam plates 204 and 206 are disposed on the planar surface 124 as stated above, and the planar edges 208 and 210 of the cam plates 204 and 206 are disposed in the plane 104 (FIGURE 2), or in alignment with the bearing faces 120 and 122 of the valve member 100. A cam arrangement 200, identical with that designated by the numeral 202, is disposed on the bottom planar face 126 of the valve member. The cam arrangement 200 includes two cam plates 204' and 206', and such cam plates have arcuate surfaces as described, and planar edges in engagement in the plane 104, or in alignment with the bearing faces of parts Y and Z of the valve member 100.

The section plane 104, as shown in FIGURES 2 and 3, makes a 45° angle with the longitudinal axis 103 of the passageway 102 in accordance with the preferred embodiment of the invention. When the plane along which the valve member is sectioned makes such an angle, then the convex cam projections are symmetrical about an axis 350 perpendicularly bisecting the planar edges of the cam plates. Specifically, as shown in FIGURE 5, projection 216 slopes in from axis 350 and the projection 218 also slopes in from such axis. The term "slopes in" as used herein designates a lessening of deviation from a circular surface. Of course, similarly the cam projections 216 and 218 may be described as sloping out from the planar edge 210 of the cam plate.

In FIGURE 5 the circular surface is shown in phantom and the cam in solid line, and it will be noted that the cam surfaces deviate from a circular configuration gradually on either side of the axis 350. The extremities of the cam surfaces are preferably at axis 350, however, they only need be located at the points 331 and 330 shown in FIGURE 5 since point 330 designates one extreme of rotation, and point 331 designates the other extreme of rotation in the embodiment shown. Cam plate 206 and cam plates 204' and 206' which make up the cam arrangement 200 disposed on the bottom planar surface 126 of the valve member have similar convex projections to those described with respect to plate 204.

From the foregoing description of the valve member and cam arrangememnts attached thereto, it should be apparent that each part of the valve member carries a cam plate at the top thereof and a cam plate at the bottom thereof. Part Y of the valve member carries cam plate 204 on its upper planar surface, and cam plate 204' on its lower planar surface. Part Z of the valve member carries cam plate 206 on its upper planar surface, and cam plate 206' on its lower planar surface. The planar edges of cam plates 204 and 206 are in engagement in the plane 104 in which the valve is sectioned, and the planar edges of cam plates 204' and 206' are in engagement in the plane 104 along which the valve member is sectioned. Thus, just as the bearing surfaces 120 and 122 of the halves Y and Z of the valve member are slidable with respect to one another, the edges 210 and 208 are slidable with respect to one another, and the edges 210' and 208' are slidable with respect to one another. The sliding movement of the planar edges of the cam plates as well as the sliding movement of one half of the valve with respect to the other, all takes place in a given plane, namely, the section plane of the valve member designated by the numeral 104.

In accordance with the invention, the valve member 100 is inserted between the valve seats 12 and 14 and then rotated to operative position, as described previously. Both halves Y and Z are thus disposed with their bearing faces 120 and 122 in engagement once the valve member has been inserted between the seats 12 and 14 as shown in FIGURE 1. After the valve member has been so inserted, the cam plates 204, 206, 204' and 206' are secured on the planar faces 124 and 126 as described hereinabove by means of screws 122. Of course, the plug member is removed to facilitate fastening cam plates 204' and 206' in position, and the cap member 56 is removed to facilitate insertion of the valve member 100, as well as securing of cam plates 204 and 206 to the valve member.

Extending through the walls of the housing 4 in alignment with the arcuate edges of the cam plates, and in perpendicular relation to the direction of fluid flow through the valve assembly, as designated by the arrows A in FIGURE 2, are a plurality of abutment means. Each of the abutment means comprises a threaded rod such as that designated by numeral 254 which extends through a threaded bore such as that designated by numeral 250. Each of the threaded rods 254 has a tip 252 which is in engagement with the arcuate edge of one of the cam plates. The threaded rods 254 can be adjusted by rotation thereof within the bore 250. Preferably each rod has an adjustment recess which can be capped by a plug such as that designated by numeral 256 to prevent further adjustment.

Although the rods 254 can be adjusted when the valve member is in any position, preferably such rods are adjusted when the tips 252 thereof are engaging the convex projections when the valve is either in open or closed position. Assuming the valve member is in the closed position shown in FIGURE 2, then the rods 254 are adjusted such that they tightly force the outer surface 206 against the valve seats 12 and 14. As explained, the parts Y and Z of the valve member are slidable along the bearing surfaces 120 and 122 thereof, and the cam plates are slidable along their engaging planar edges so that the dimension of the valve member between the seats increases as the rods 254 press more tightly against the convex projections.

After the rods 254 have been adjusted as described so that the valve member is tightly seated in open or closed position depending on the projection engaged during adjustment, then as the valve member is rotated, the end 252 of the rod rides down on the projection it engages away from the extremity thereof and into a dwell space.

If the valve member is further rotated in the same direction, then the ends 252 of each rod 254 engage the next convex projection on the adjacent cam plate, and ride up on such projection until the valve member has been rotated through 90°. Accordingly, as the valve member is rotated from one position to another, the ends 252 of the rods 254, or the abutments, ride up and down on the concavo-convex surfaces of the cam plates. When the valve is moved to closed position, then the abutments are riding up on a convex projection, and a force is applied tending to cause the valve halves Y and Z to slide along their bearing faces 120 and 122 and more tightly engage the seats 12 and 14. It should be obvious that two rods or abutments cooperate with cam plates 204 and 206 carried at the top of the valve member and that two rods or abutments are also provided in the lower portion of the housing to cooperate with plates 204' and 206'.

Since the cam plates are provided with two convex projections symmetrical about dwell spaces over 90 rotational degrees, when the valve is rotated from closed position, as shown in FIGURE 2, to the open position where the passageway communicates the ports, as shown in FIGURE 3, the abutments or rods pass over the arcuate surfaces of the cam plates from one convex projection past the dwell space and onto the other convex projection carried by the adjacent cam plate with which the particular abutment cooperates. Thus, as the valve member is moved from open position to closed position, or from closed position to open position, the force tending to cause the halves Y and Z of the valve member to slide with respect to one another is reduced from a maximum to a minimum and then increased from the minimum to the maximum.

The cams have been shown as extending completely over the planar faces 124 and 126 of the valve member, however, it should be apparent that the plates can have smaller dimensions if desired. Additionally, it should be pointed out that the symmetrical cam arrangement described ensures uniform distribution of forces and thus trouble-free operation.

Although I have not described the manner in which the valve stem 66 cooperates with the valve member in detail hereinabove, and although such cooperation forms no significant part of the present invention, for illustrative purposes I have shown the cam plates 204 and 206 carried at the top of the valve member as being provided wth rectangular recesses 300 and 302, and I have shown the valve stem 66 as carrying a rectangular key 304. The length of the key 304 is shorter than the length of the recesses 300 and 302 so that when the cam plates 204 and 206 are offset as shown in the exaggerated position of FIGURE 4, the key 304 will not interfere with the operation.

After considering the foregoing description of the detailed construction of the preferred embodiment of my invention shown in the drawing, it will be appreciated that I have provided a fluid valve assembly incorporating a rotatable valve member and means for automatically causing the valve member to more tightly engage the valve seats of the assembly when the valve member is moved into or out of closed position. My arrangement accomplishes, in addition to tighter seating in the closed position, automatic tighter seating in the open position. The means for automatically causing the valve member to more tightly engage the seats in open and closed positions includes cam means carried by the valve member and abutment means carried by the housing and cooperating with the cam means. The valve member is sectioned, and preferably the plane along which the valve member is sectioned extends diagonally across the longitudinal axis of the passageway through the valve member and intersects the exterior surface of the valve member outside of the area thereof engageable by the seats. Thus, the intersecting lines between the two halves of the valve member never engage the seats.

As explained, the cam means provided by the invention preferably comprise a plurality of cams with planar edge portions and arcuate edge portions, and the cams are carried by the valve member and disposed with the planar edge portion of one cam in engagement with the planar edge portion of another cam along the plane in which the valve member is sectioned. The planar edge portions of the cams, in other words, are aligned with the bearing faces of the halves Y and Z of the valve member. The arcuate edge portions of the cams are in cooperative engagement with the abutment means, and the abutment means preferably take the form of threaded rods extending through suitable apertures in the valve housing.

As also clearly explained, the valve member is of truncated spheroidal shape, and has spaced planar surfaces extending parallel to each other and parallel to the passageway through the valve member. The distance between the planar faces of the valve member is less than the minimum distance between the valve seats so that the valve can be slipped non-cooperatively between the seats and rotated through 90° to operative position.

Although in the detailedd escription of the invention I refer to the cam arrangements as including cam plates 204, 206, 204' and 206', it should be understood that such plates can be referred to as cams, cam members, or cam plates, and that various types of cams can be used without departing from the scope and spirit of the invention. According to the preferred embodiment of the invention, the cams are carried at the top and bottom of the valve member and cooperate with the abutments to cause the valve member to more tightly seat in open position and closed position than in any position therebetween. The cams provide a concavo-convex surface cooperating with each abutment which consists of two convex edge portions or projections symmetrical on either side of a concave edge portion. The concave edge portion forms a dwell space.

By providing a valve member of spheroidal outline, with planar opposed faces, the assembly of the improved valve structure is facilitated and efficient operation is ensured. Stationary valve seats can be used and thus the necessity of providing an accurately-aligned bore into which an inelt or outlet port member can be threaded is eliminated.

From the foregoing detailed description of the preferred embodiment of my invention, it should be apparent that the objects set forth at the outset of this specification have been successfully achieved. Obviously, various modifications of the invention will become apparent to those of ordinary skill in the art, and thus the foregoing description is intended as illustrative.

What is claimed is:

1. A fluid valve assembly comprising the combination of a valve housing having a valve chamber therein with a fluid inlet port and a fluid outlet port at opposite sides of the chamber, valve seats adapted to accommodate an arcuate valve surface forming the interior terminal ends of each of said ports, a valve member comprising at least two separable relatively movable sections and having a passageway therethrough, said valve member being rotatably disposed in engagement with, and between said seats whereby said valve member is rotatable from a first position where said passageway communicates said ports to a second position where said valve member closes said ports, said sections of said valve members respectively engaging opposite of said seats, and means operable in response to rotation of said valve member for automatically causing said valve member to more tightly engage said seats when in said first and second positions than when in any position therebetween.

2. A fluid valve assembly as defined in claim 1 wherein said valve seats have sphero-concave valve member engaging surfaces, wherein said valve member has a truncated spheroidal outline, and at least substantially planar spaced faces extending parallel to each other and to said passageway, the distance between said faces being less than the distance between seats whereby the valve member can be non-cooperatively slipped between the seats for the insertion and removal thereof, and wherein said means for automatically causing said valve member to more tightly engage said seats includes cam means carried by said valve member, and abutment means carried by said housing and cooperating with said cam means.

3. A fluid valve assembly as defined in claim 1 wherein said valve member is sectioned along a plane extending diagonally across the longitudinal axis of said passageway and intersecting the exterior surface of said valve member outside the area thereof engageable by said seats.

4. A fluid valve assembly as defined in claim 3 wherein said means for automatically causing said valve member to more tightly engage said seats includes cam means carried by said valve member, and abutment means carried by said housing and cooperating with said cam means.

5. A fluid valve assembly as defined in claim 4 wherein said valve seats have sphero-concave valve member engaging surfaces, wherein said valve member has a truncated spheroidal outline, wherein said cam means comprises a plurality of cams with planar edge portions and arcuate edge portions, and wherein said cams are carried by said valve member and disposed with the planar edge portion of one cam in engagement with the planar edge portion of another cam along said plane extending diagonally across the longitudinal axis of said passageway, and with said arcuate edge portions in cooperative engagement with said abutment means.

6. A fluid valve assembly as defined in claim 5 wherein said valve member has spaced planar faces extending parallel to each other and parallel to said passageway, the distance between said faces being less than the distance between said seats whereby said valve member can be non-cooperatively slipped between said seats for insertion and removal thereof, wherein said cams are plates having planar edges and cooperating to provide a concavo-convex edge engageable by said abutment means, and wherein said assembly further includes means for securing said plates to said planar faces of said valve member.

7. A fluid valve assembly as defined in claim 6 wherein said assembly includes a plurality of abutment means and wherein said abutment means are adjustable.

8. A fluid valve assembly as defined in claim 7 wherein said abutment means comprise threaded rods, and wherein said housing is provided with threaded bores aligned with the edge portions of said cam plates, said bores cooperating with said rods whereby the inner ends of said rods engage the concavo-convex edge portions of said cam plates.

9. A fluid valve assembly as defined in claim 8 wherein two cam plates are disposed on each of said planar faces of said valve member and wherein the arcuate edge portion of each cam plate defines two convex edge portions symmetrical about an axis perpendicularly bisecting said planar edge.

10. A fluid valve assembly as defined in claim 1 wherein said means for automatically causing said valve member to more tightly engage said seats comprises a plurality of cam members carried by said valve member and abutment means carried by said housing and cooperating with said cam members, said cam members being disposed generally parallel to said passageway and perpendicular to the plane of said seats, said cam members having arcuate edge portions and planar edge portions, the planar edge portion of one cam member engaging the planar edge portion of another cam member in the plane in which said valve member is sectioned, the arcuate edge portion of each of said cams including two smoothly-curved cam projections symmetrically disposed on either side of an axis bisecting the planar edge portion, and engageable with said abutment means.

11. A fluid valve assembly as defined in claim 10 wherein said abutment means comprises a plurality of adjustable abutments disposed in alignment with said smoothly-curved projections.

12. A fluid valve assembly as defined in claim 11 wherein one of said two smoothly-curved cam projections slopes outwardly from its junction with said planar edge portion to at least a point aligned with the longitudinal axis of said passageway, wherein the other of said two projections slopes outwardly from its junction with said planar edge portion at least to a point aligned with an axis extending perpendicular to said longitudinal axis of said passageway, and wherein the plane in which said valve member is sectioned makes an angle of at least substantially 45° with the longitudinal axis of said passageway.

13. A fluid valve assembly as defined in claim 1 wherein said means for automatically causing said valve member to more tightly engage said seats comprises a plurality of cams carried by said valve member, and abutment means carried by said housing and cooperating with said cams for causing the sections of said valve member to slide along the engaging surfaces between said sections and thereby increase the dimension of said valve member extending between said seats.

14. A fluid valve assembly comprising the combination of a valve housing having a valve chamber therein with a fluid inlet and a fluid outlet port at opposite sides of the chamber, spaced valve seats adapted to accommodate a spherical valve surface forming the interior terminal ends of each of said ports, a valve member of truncated spheroidal outline having a passageway therethrough, said valve member being rotatably disposed in engagement with, and between said seats whereby said valve member is rotatable from a first position where said passageway communicates said ports to a second position where said valve member closes said ports, said valve member having at least substantially planar spaced faces extending parallel to each other and to said passageway, the distance between said faces being less than the distance between said spaced valve seats whereby the valve member can be non-cooperatively slipped between the seats for the insertion and removal thereof, said valve member being sectioned along a plane extending generally perpendicular to said planar spaced faces and diagonally across said passageway whereby said valve member comprises two sections having engaging bearing faces in said plane, and cam means operable in response to rotation of said valve member for automatically causing said sections to slide along said bearing faces whereby the outer surfaces of each of said sections more tightly engages its associated valve seat when said valve member is in said first and second positions than when in any position therebetween.

15. A fluid valve assembly as defined in claim 14 wherein said plane intersects the longitudinal axis of said passageway at substantially a 45° angle, wherein said cam means comprises a plurality of cam members and a plurality of abutments cooperating therewith, each of said cam members including two arcuate cam surfaces and a planar edge, and wherein a pair of said cam members is carried on each of said spaced planar faces of said valve member.

16. A fluid valve assembly as defined in claim 15 wherein one of said arcuate cam surfaces of each of said cam members slopes outwardly from said planar edge at least to a point aligned with the longitudinal axis of said passageway, wherein the other of said arcuate cam surfaces of each of said cam members slopes outwardly from said planar edge at least to a point aligned with an axis extending perpendicular to said longitudinal axis of said passageway, and wherein the plane along which said valve member is sectioned makes an angle of at least substantially 45° with the longitudinal axis of said passageway.

17. A fluid valve assembly as defined in claim 16 wherein each of said cam members comprises a generally semi-circular cam plate with a planar edge, and wherein the planar edges of each pair of cam members are in engagement and aligned with said bearing faces.

18. A fluid valve assembly comprising the combination of a valve housing having a valve chamber therein with a fluid inlet port and a fluid outlet port at opposite sides of the chamber, valve seats adapted to accommodate an arcuate valve surface forming the interior terminal ends of each of said ports, a two-section valve member having a passageway therethrough, said valve member being rotatably disposed in engagement with, and between said seats whereby said valve member is rotatable from a first position where said passageway communicates said ports to a second position where said valve member closes said ports, said sections of said valve member respectively engaging opposite of said seats, and means operable in response to rotation of said valve member for automatically causing said valve member to more tightly engage said seats when said valve member is moved into or out of said positions.

19. A fluid valve assembly as defined in claim 18 wherein said valve seats have sphero-concave valve member engaging surfaces, wherein said valve member has a truncated spheroidal outline, and at least substantially planar spaced faces extending parallel to each other and to said passageway, the distance between said faces being less than the distance between seats whereby the valve member can be non-cooperatively slipped between the seats for the insertion and removal thereof, and wherein said means for automatically causing said valve member to more tightly engage said seats includes cam means carried by said valve member, and abutment means carried by said housing and cooperating wtih said cam means.

References Cited in the file of this patent

UNITED STATES PATENTS

| | | |
|---|---|---|
| 196,474 | Perkins | Oct. 23, 1877 |
| 1,949,191 | Smolensky | Feb. 27, 1934 |
| 2,072,965 | Robinson et al. | Mar. 9, 1937 |
| 2,104,056 | Scheitzer | Jan. 4, 1938 |
| 2,277,975 | Heggem | Mar. 31, 1942 |
| 2,333,424 | Humphreys | Nov. 2, 1943 |